United States Patent
Ishii

(10) Patent No.: US 7,257,765 B2
(45) Date of Patent: Aug. 14, 2007

(54) RATE DEMATCHING PROCESSOR

(75) Inventor: Daiji Ishii, Tokyo (JP)

(73) Assignee: NEC Corporation, Tokyo (JP)

( * ) Notice: Subject to any disclaimer, the term of this patent is extended or adjusted under 35 U.S.C. 154(b) by 492 days.

(21) Appl. No.: 10/869,079

(22) Filed: Jun. 17, 2004

(65) Prior Publication Data

US 2004/0261006 A1    Dec. 23, 2004

(30) Foreign Application Priority Data

Jun. 18, 2003    (JP) ............................. 2003-173297

(51) Int. Cl.
*H03M 13/11*    (2006.01)
(52) U.S. Cl. ...................... 714/790; 714/800
(58) Field of Classification Search ............... 714/790, 714/800; H03M 13/11
See application file for complete search history.

(56) References Cited

U.S. PATENT DOCUMENTS

2003/0135811 A1* 7/2003 Xu et al. ..................... 714/790
2004/0187069 A1* 9/2004 Pietraski et al. ............ 714/786

FOREIGN PATENT DOCUMENTS

| JP | 2002-9633 A | 1/2002 |
| JP | 2002-199048 A | 7/2002 |
| JP | 2002-208863 A | 7/2002 |

* cited by examiner

*Primary Examiner*—R. Stephen Dildine
(74) *Attorney, Agent, or Firm*—Sughrue Mion, PLLC

(57) ABSTRACT

(3n+1)th (n=0, 1, 2, . . . , M/3−1) input data is stored in a first memory 102, (3n+2)th (n=0, 1, 2, . . . , M/3−1) input data is stored in a second memory 103, and (3n+3)th (n=0, 1, 2, . . . , M/3−1) input data is stored in a third memory 104. Information bit, first parity bit, and second parity bit that have been read out by 3 bits are held in an information bit queue 108, a first parity bit queue 109, and a second parity bit queue 110, respectively, to control data supply to the rate dematching circuits 111 and 112 by these queues 108, 109 and 110.

4 Claims, 6 Drawing Sheets

FIG.4

| FIRST MEMORY 102 | SECOND MEMORY 103 | THIRD MEMORY 104 |
|---|---|---|
| S1 | S2 | S3 |
| S4 | S5 | S6 |
| S7 | S8 | S9 |
| S10 | S11 | S12 |
| S13 | S14 | S15 |
| S16 | S17 | S18 |
| ... | ... | ... |
|  | P1 | P2 |
| P3 | P4 | P5 |
| P6 | P7 | P8 |
| P9 | P10 | P11 |
| P12 | P13 | P14 |
| P15 |  |  |
| ... | ... | ... |
|  |  | Q1 |
| Q2 | Q3 | Q4 |
| Q5 | Q6 | Q7 |
| Q8 | Q9 | Q10 |
| Q11 | Q12 | Q13 |
| Q14 | Q15 |  |
| ... | ... | ... |

} M/3

RATE DEMATCHING PROCESSOR

BACKGROUND OF THE INVENTION

1. Field of the Invention

The present invention relates to a rate dematching processor which performs rate dematching at a receiving end with respect to the data that has been subjected to rate matching at a sending end, that is, the rate dematching processor which inserts, at a receiving end, dummy data into a position of the data that has been thinned out at the sending (transmitting) end or deletes, at the receiving end, the repeated data at the sending end.

2. Description of the Related Art

As one of 3rd Generation Partnership Project (3GPP) international standards relating to a mobile radio (wireless) communication system, a wideband code division multiple access (W-CDMA) system has been known. This system involves various processes. A rate matching process is one of the processes, which adjusts differences in rate between send data and a physical channel.

In the rate matching process, when a rate of send data is higher than a rate of the physical channel, several pieces of data are thinned out (hereinafter, referred to as "punctured") in a sending data string, thereby allowing the rate of send data to correspond to the rate of the physical channel. On the other hand, when the rate of send data is lower than the rate of physical channel, several pieces of data are repeated in the sending data string, thereby allowing the rate of send data to correspond to the rate of the physical channel.

At receiving end, a rate dematching process, which is a reverse process of the rate matching process, is performed. In the rate dematching process, dummy data are inserted into a position of the data that has been punctured at sending end, or the data repeated in sending end is deleted.

The apparatus that performs the above rate dematching process has been disclosed in JP-A-2002-199048 (Japanese Patent Application Publication No. 2002-199048). The apparatus disclosed in JP-A-2002-199048 (hereinafter, referred to as "conventional apparatus") comprises, as shown in FIG. 1, information bit memory (memory for information bit) 202, first parity bit memory (memory for first parity bit) 203, second parity bit memory (memory for second parity bit) 204, switch 201 which sorts input data into these three memories 202 to 204, first parity bit rate dematching circuit (rate dematching circuit for first parity bit) 205 which applies the rate dematching process to a first parity bit, and second parity bit rate dematching circuit (rate dematching circuit for second parity bit) 206 which applies the rate dematching process to a second parity bit. This conventional apparatus performs rate dematching process to the data that have been punctured at sending end to the turbo-encoded data with coded rate 1/3. Note that the data that have been turbo-encoded are made up of three-bit strings; an information bit, a first parity bit and a second parity bit.

Next, an operation of the conventional apparatus will be described. Input data are sorted and the sorted data are stored in any of the information bit memory 202, the first parity bit memory 203 and the second parity bit memory 204. The switch 201 sorts the input data into these three memories 202 to 204. That is, when an information bit is input, the switch 201 sorts it into the information bit memory 202. Likewise, when a first parity bit is input, the switch 201 sorts it into the first parity bit memory 203. When a second parity bit is input, the switch 201 sorts it into the second parity bit memory 204.

The data stored in the information bit memory 202 are output, as device output A, to outside of the apparatus without change. The data stored in the first parity bit memory 203 are input to the first parity bit rate dematching circuit 205. The first parity bit rate dematching circuit 205 performs rate dematching process to the input data and outputs the processed data to outside of the apparatus as device output B. The data stored in the second parity bit memory 204 are input to the second parity bit rate dematching circuit 206. The second parity bit rate dematching circuit 206 performs rate dematching process to the input data and outputs the processed data to outside of the apparatus as device output C.

In 3GPP, a new function called "High Speed Downlink Packet Access (HSDPA)" will be added to W-CDMA international standard for the purpose of realizing much faster mobile radio communication. HSDPA is a technique for speeding up a downward packet transmission (that is, transmission from a base station to a mobile station). As one of the process in the HSDPA, rate-matching process called "first rate matching" has been known. The following limitations has been set in first rate matching process, as compared to the general rate matching process:

(1) Repeating is not performed (that is, only puncturing is performed).

(2) Total data amount of information bit, first parity bit and second parity bit after first rate matching is limited by constant value M.

With respect to the limitation (2), in the case where the total data amount M after first rate matching process is, for example, 30 bits, the following cases are possible. The following cases do not cover every cases, but shows typical cases.

(Case 1)

In the case of 20 bits for information bit, 20 bits for first parity bit and 20 bits for second parity bit in a state before first rate matching process, first parity bit and second parity bit are punctured by 15 bits, respectively, resulting in 30 bits in total. That is, in a state after first rate matching process, the information bit, first parity bit and second parity bit have 20 bits, 5 bits and 5 bits, respectively.

(Case 2)

In the case of 30 bits for information bit, 30 bits for first parity bit and 30 bits for second parity bit in a state before first rate matching process, first parity bit and second parity bit are punctured by 30 bits, respectively, resulting in 30 bits in total. That is, in a state after first rate matching process, the information bit, first parity bit and second parity bit have 30 bits, 0 bits and 0 bits, respectively.

(Case 3)

In the case of 10 bits for information bit, 10 bits for first parity bit and 10 bits for second parity bit in a state before first rate matching, any of these bits are not punctured, resulting in 30 bits in total. That is, in a state after first rate matching process, the information bit, first parity bit and second parity bit have 10 bits, 10 bits and 10 bits, respectively.

In the above three cases, the maximum data amount for each of the information bit, first parity bit and second parity bit after first rate matching process can be assumed as follows; 30 bits for information bit (case 2), 10 bits for first parity bit (case 3), and 10 bits for second parity bits (case 3). In this case, when first rate dematching process, which is a reverse process of first rate matching process, is performed in the conventional apparatus, capacities of 30 bits, 10 bits and 10 bits are required for the memories 202, 203 and 204 of FIG. 1, respectively. It follows that total capacity N of the memories 202, 203, and 204 is 50 bits, which is larger than the total data amount M (30 bits) after first rate matching process by 20 bits.

Since the values M and N are small in the above example, the difference between the value M and the value N is correspondingly small (20 bits). However, the value of M actually used in practical operations is considerably large (thousands to tens of thousands). Accordingly, the difference between M and N is considerably large.

SUMMARY OF THE INVENTION

An object of the present invention is to provide a rate dematching processor which can reduce total required memory.

To achieve the above object, a rate dematching processor according to the present invention, which performs rate dematching with respect to rate matched data including information bit, first parity bit and second parity bit, comprises: one or a plurality of memories which store the data input; a data reading out means for reading out the information bit, first parity bit, and second parity bit from the one or a plurality of memories 3n bits at a time, with n being as a natural number; a data holding means provided at least for each of the information bit, first parity bit, and second parity bit, for holding the data read out by the data readout means in order to control data supply to a rate dematching circuit.

In the rate dematching processor according to the present invention, unlike the conventional apparatus in which three memories are used as an information bit memory, a first parity bit memory, and a second parity bit memory, (3n+1)th (n=0, 1, 2, . . . , M/3−1; 3n indicates n times 3) input data is stored in a first memory, (3n+2)th (n=0, 1, 2, . . . , M/3−1; 3n indicates n times 3) input data is stored in a second memory, and (3n+3)th (n=0, 1, 2, . . . , M/3−1; 3n indicates n times 3) input data is stored in a third memory (M/3−1 indicates M/3 minus 1). Accordingly, each of the first memory, second memory, and third memory has a capacity of M/3 bits. Thus, total capacity N of the three memories corresponds to limit value M, thereby making a value of N smaller than in the case of the conventional apparatus.

However, when 1 bit of information bit, 1 bit of first parity bit, and 1 bit of second parity bit are simultaneously read out from the three memories that store data as described above, an access conflict that accesses are simultaneously made to one memory may occur, with the result that desired data cannot be read out in some cases. To prevent the access conflict from occurring, any one of 3 bits of information bit, 3 bits of first parity bit, 3 bits of second parity bit should be read at a time. In this manner, information bit, first parity bit, and second parity bit that have been read out by 3 bits are held in an information bit queue, a first parity bit queue, and a second parity bit queue, respectively, to control data supply to the rate dematching circuit by these queues. Each of the information bit queue, first parity bit queue, and second parity bit queue has a capacity of 6 bits, which is vanishingly small, as compared to the values of N and M (thousands to tens of thousands) used in practical operations.

According to the present invention, total capacity N of the memories used in the rate dematching processor is allowed to correspond to limit value M, thereby making a value of N smaller than in the case of the conventional apparatus.

BRIEF DESCRIPTION OF THE DRAWINGS

FIG. 4 is a view showing a data allocation in the memories 102, 103 and 104 of the rate dematching processor according to the first embodiment of the present invention;

DETAILED DESCRIPTION OF THE PREFERRED EMBODIMENTS

Embodiments of the present invention will be described below in detail with reference to the accompanying drawings.

First Embodiment

Figure 1:
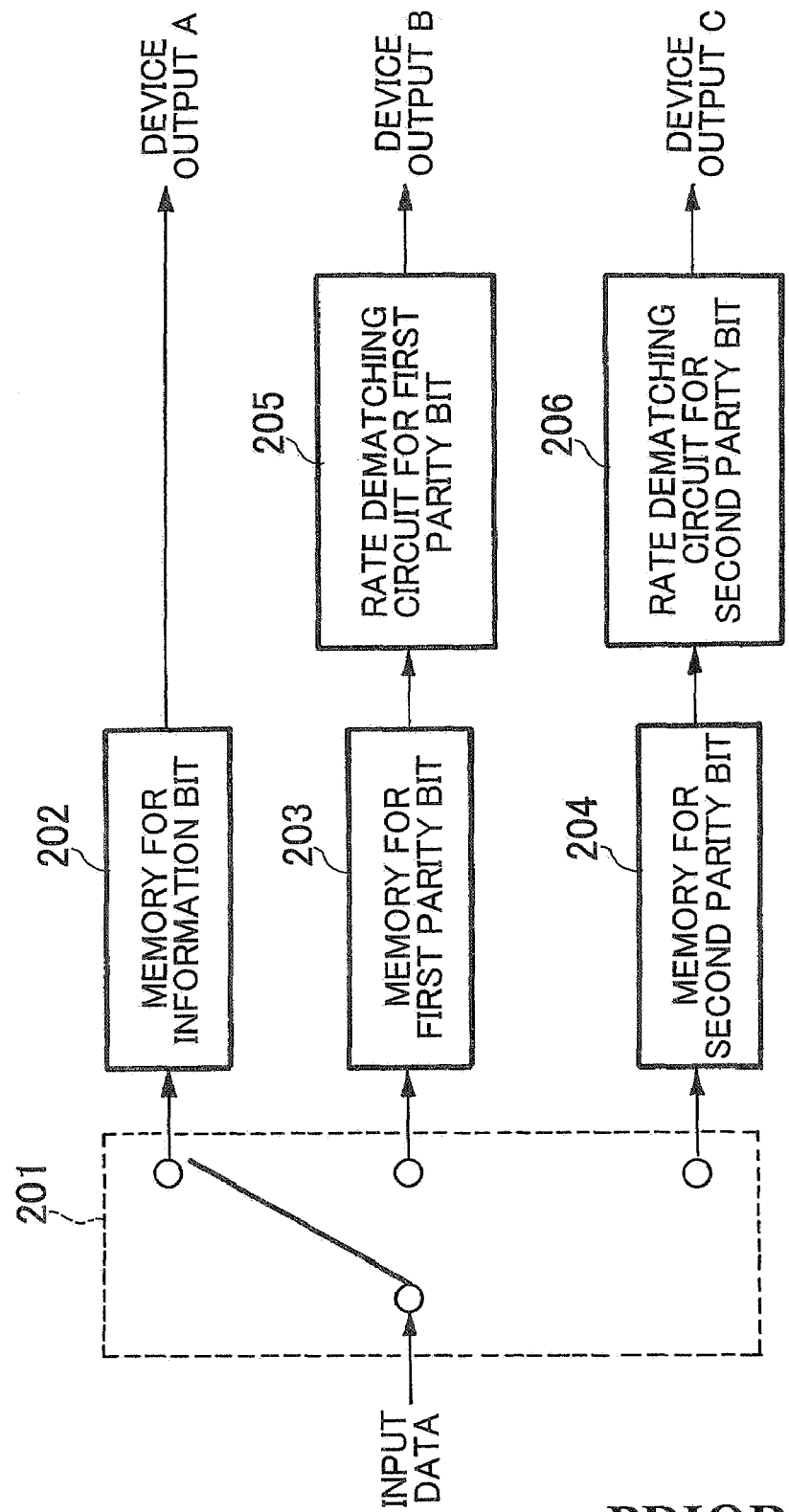
FIG. 1 is a block diagram showing the configuration of a rate dematching processor according to the related art.
Figure 2:
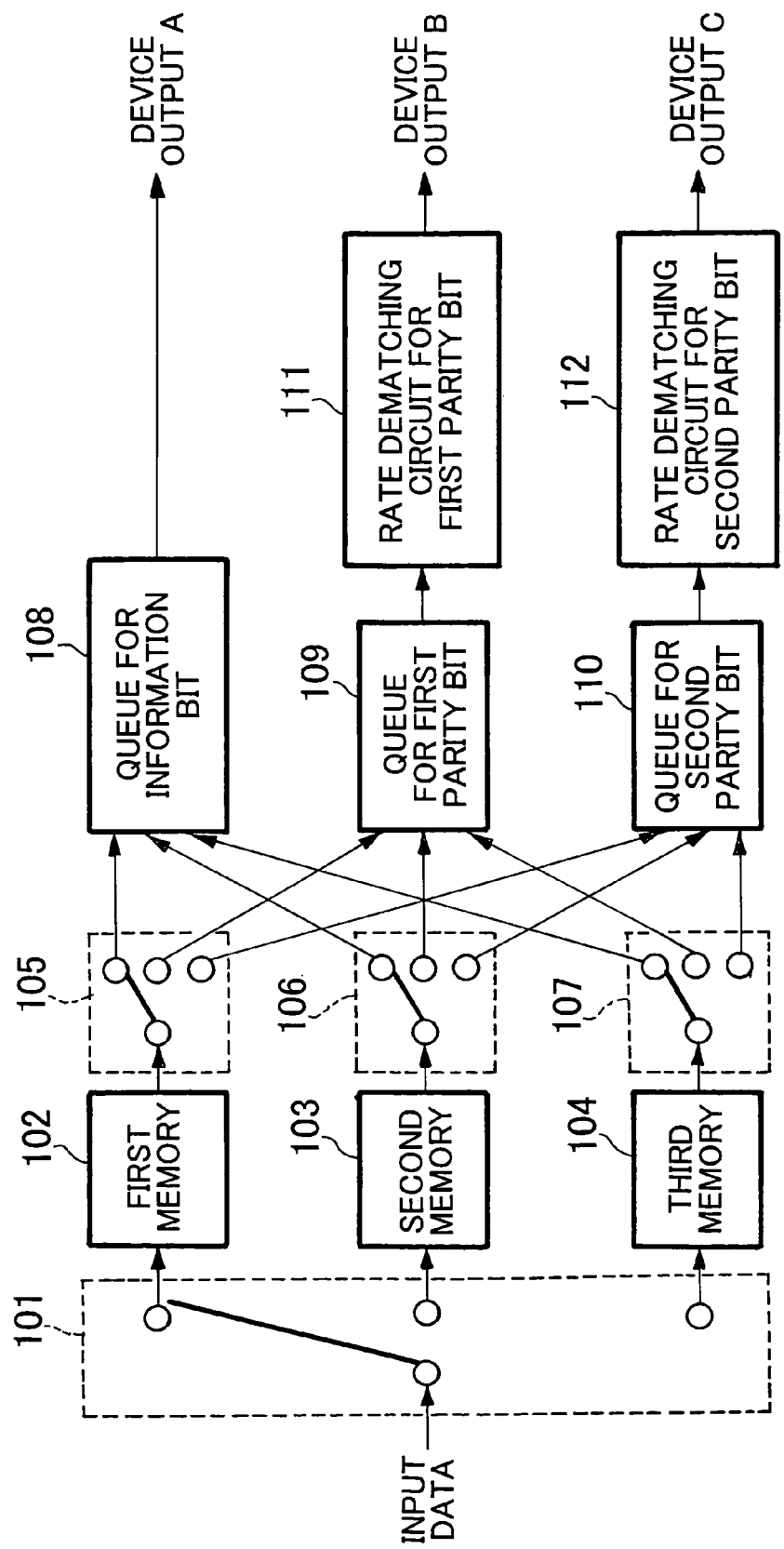
FIG. 2 is a block diagram showing the configuration of a rate dematching processor according to a first embodiment of the present invention.

FIG. 2 is a block diagram showing the configuration of a rate dematching processor according to a first embodiment of the present invention. The rate dematching processor performs first rate dematching process and includes switch 101, first memory 102, second memory 103, third memory 104, switches 105, 106 and 107, information bit queue (queue for information bit) 108, first parity bit queue (queue for first parity bit) 109, second parity bit queue (queue for second parity bit) 110, first parity bit rate dematching circuit (rate dematching circuit for first parity bit) 111, and second parity bit rate dematching circuit (rate dematching circuit for second parity bit) 112.

The switch 101 sorts input data into the three memories 102, 103, and 104.

Each of the first memory 102, second memory 103 and third memory 104 stores the data sorted by the switch 101.

The switch 105 sorts the data output from the memory 102 into the three queues 108, 109 and 110. The switch 106 sorts the data output from the memory 103 into the three queues 108, 109 and 110. The switch 107 sorts the data output from the memory 104 into the three queues 108, 109 and 110.

The information bit queue 108 holds information bit sorted by each of the switches 105, 106 and 107. The first parity bit queue 109 holds first parity bit sorted by each of the switches 105, 106 and 107. The second parity bit queue 110 holds second parity bit sorted by each of the switches 105, 106 and 107.

The first parity bit rate dematching circuit 111 applies first rate dematching process to the data held by the first parity bit queue 109. The second parity bit rate dematching circuit 112 applies first rate dematching process to the data held by the second parity bit queue 110.

Assuming that M pieces of data are input, each of the first memory 102, second memory 103 and third memory 104 has a capacity of M/3 bits, and each of the information bit queue 108, first parity bit queue 109 and second parity bit queue 110 has a capacity of 6 bits.

Next, an operation of the rate dematching processor according to the present embodiment will be described.

It is assumed that M pieces of input data in total are input to the rate dematching processor according to the present embodiment in the order of an information bit string, a first parity bit string and a second parity bit string. Note that the information bit, first parity bit and second parity bit are included in M pieces of input data at an arbitrary ratio.

(Step 1) First input data is input into the rate dematching processor according to the present embodiment. The switch 101 is then connected to the first memory 102 so as to store the first input data in the memory 102.

(Step 2) Second input data is input into the rate dematching processor according to the present embodiment. The switch 101 is then connected to the second memory 103 so as to store the second input data in the memory 103.

(Step 3) Third input data is input into the rate dematching processor according to the present embodiment. The switch 101 is then connected to the third memory 104 so as to store the third input data in the memory 104.

(Step 4) Subsequently, the same process as step 1 is performed to $(3n+1)$th ($n=1, 2, \ldots, M/3-1$; 3n indicates n times 3) input data, the same process as step 2 is performed to $(3n+2)$th ($n=1, 2, \ldots, M/3-1$; 3n indicates n times 3) input data and the same process as step 3 is performed to $(3n+3)$th ($n=1, 2, \ldots, M/3-1$; 3n indicates n times 3) input data ($M/3-1$ indicates M/3 minus 1). In this manner, M pieces of input data are stored in the memories 102, 103 and 104.

(Step 5) The following steps 5-1 to 5-4 are performed in parallel.

(Step 5-1) The switches 105, 106, and 107 are connected to the information bit queue 108. The information bit is then read out, by 1 bit, from each of the memories 102, 103 and 104 to store 3 bits of information bits in the information bit queue 108 in total.

(Step 5-2) Information bit stored at the head of the information bit queue 108 is read out and output as device output A.

(Step 5-3) When an insertion of dummy data is performed in the first parity bit rate dematching circuit 111 (in this case, the data has been punctured in first rate matching process at sending end), the dummy data is output as device output B. Alternatively, first parity bit stored at the head of the first parity bit queue 109 is read out and output as device output B.

(Step 5-4) When an insertion of dummy data is performed in the second parity bit rate dematching circuit 112 (in this case, the data has been punctured in first rate matching process at sending end), the dummy data is output as device output C. Alternatively, second parity bit stored at the head of the second parity bit queue 110 is read out and output as device output C.

(Step 6) The following steps 6-1 to 6-4 are performed in parallel.

(Step 6-1) The switches 105, 106, and 107 are connected to the first parity bit queue 109. When the data having a data amount equal to or less than 3 bits is left in the first parity bit queue 109, the first parity bit is read out, by 1 bit, from each of the memories 102, 103, and 104 to store 3 bits of first parity bits in the first parity bit queue 109 in total. When the data having a data amount equal to or more than 4 bits is left in the first parity bit queue 109, since there is no space for newly storing 3 bits of the first parity bits, nothing is performed.

(Step 6-2) Information bit stored at the head of the information bit queue 108 is read out and output as device output A.

(Step 6-3) When an insertion of dummy data is performed in the first parity bit rate dematching circuit 111, the dummy data is output as device output B. Alternatively, first parity bit stored at the head of the first parity bit queue 109 is read out and output as device output B.

(Step 6-4) When an insertion of dummy data is performed in the second parity bit rate dematching circuit 112, the dummy data is output as device output C. Alternatively, second parity bit stored at the head of the second parity bit queue 110 is read out and output as device output C.

(Step 7) The following steps 7-1 to 7-4 are performed in parallel.

(Step 7-1) The switches 105, 106, and 107 are connected to the second parity bit queue 110. When the data having a data amount equal to or less than 3 bits is left in the second parity bit queue 110, second parity bit is read out, by 1 bit, from each of the memories 102, 103 and 104 to store 3 bits of second parity bits in the second parity bit queue 110 in total. When the data having a data amount equal to or more than 4 bits is left in the second parity bit queue 110, since there is no space for newly storing 3 bits of the second parity bit, nothing is performed.

(Step 7-2) Information bit stored at the head of the information bit queue 108 is read out and output as device output A.

(Step 7-3) When an insertion of dummy data is performed in the first parity bit rate dematching circuit 111, the dummy data is output as device output B. Alternatively, first parity bit stored at the head of the first parity bit queue 109 is read out and output as device output B.

(Step 7-4) When an insertion of dummy data is performed in the second parity bit rate dematching circuit 112, the dummy data is output as device output C. Alternatively, second parity bit stored at the head of the second parity bit queue 110 is read out and output as device output C.

(Step 8) First rate dematching process can be performed to all data by repeating the above steps 5 to 7.

Figure 3:
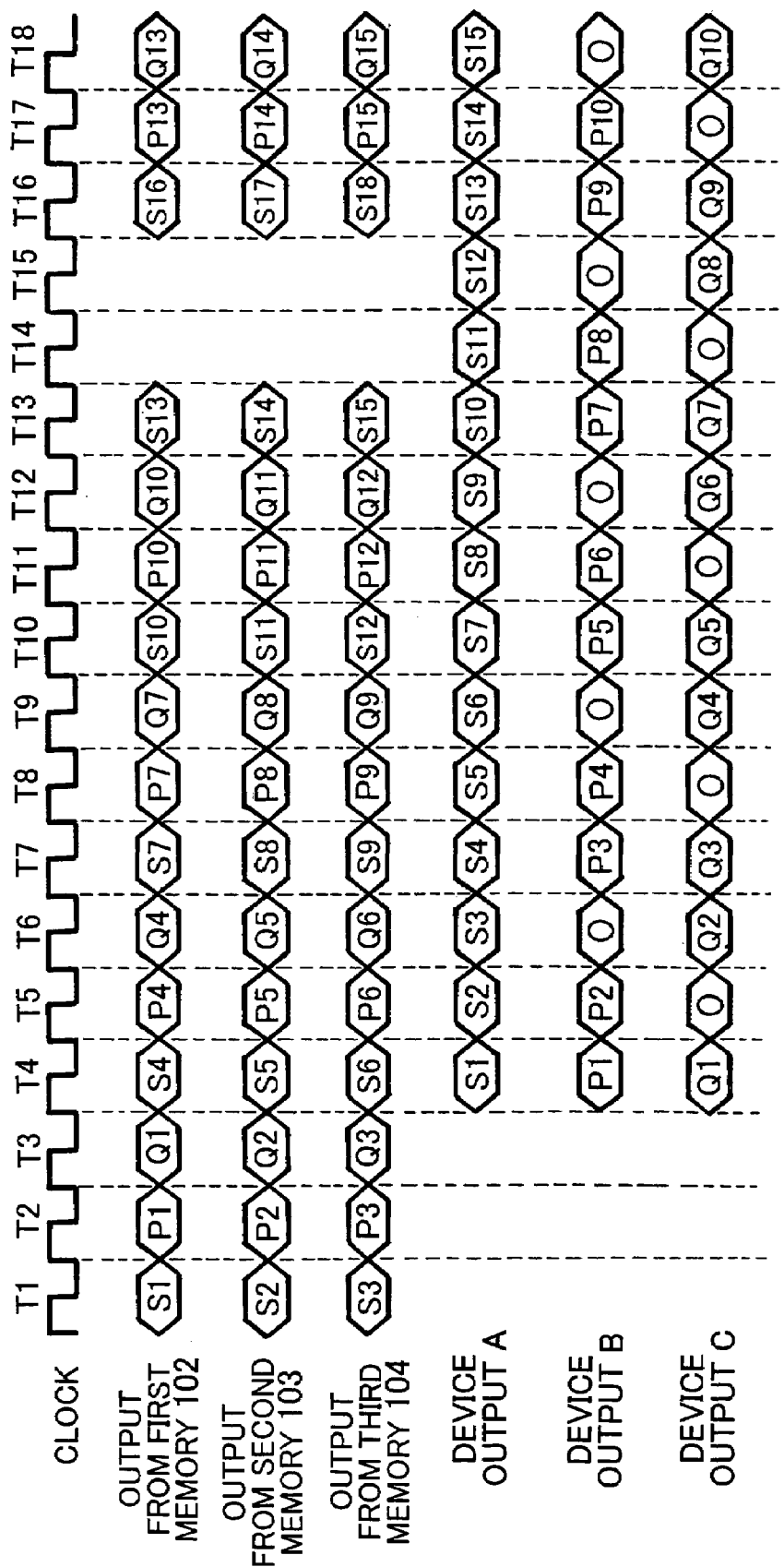
FIG. 3 is a timing chart for explaining the operation of the rate dematching processor according to the first embodiment of the present invention.

Of the above processing sequence, operation timing in the steps 5 to 8 will be described in detail with reference to FIG. 3. In FIG. 3, 3rd, 6th, 9th, 12th and 15th first parity bits, and 2nd, 5th, 8th, 11th and 14th second parity bits are punctured in first rate matching process performed at sending end.

A data allocation of each of memories 102, 103 and 104 after step 4 is shown in FIG. 4. In FIGS. 3 and 4, Sk, Pk, and Qk (k is a positive integer) respectively denote k-th information bit, k-th first parity bit, and k-th second parity bit input into the rate dematching processor according to the present embodiment.

Process at periods T1 to T18 in FIG. 3 will be described below.

(Period T1) Information bits S1, S2 and S3 are read out respectively from the first memory 102, second memory 103 and third memory 104 and then stored in the information bit queue 108.

(Period T2) First parity bits P1, P2 and P3 are read out respectively from the second memory 103, third memory 104 and first memory 102 and then stored in the first parity bit queue 109 (note that in FIG. 4, storage of the first parity bit is performed starting from the second memory 103).

(Period T3) Second parity bits Q1, Q2 and Q3 are read out respectively from the third memory 104, first memory 102 and second memory 103 and then stored in the second parity bit queue 110 (note that in FIG. 4, storage of the second parity bit is performed starting from the third memory 104).

(Period T4) Information bits S4, S5, and S6 are read out respectively from the first memory 102, second memory 103 and third memory 104 and then stored in the information bit queue 108. In parallel with this, the data S1 at the head of the information bit queue 108 is output as device output A. Further, the data P1 at the head of the first parity bit queue 109 and the data Q1 at the head of the second parity bit queue 110 are output respectively as device output B and device output C.

(Period T5) First parity bits P4, P5 and P6 are read out respectively from the second memory 103, third memory 104 and first memory 102, and then stored in the first parity bit queue 109. In parallel with this, the data S2 at the head of the information bit queue 108 is output as device output A. Further, the data P2 at the head of the first parity bit queue 109 is output as device output B. Further, since the 2nd second parity bit has been punctured, dummy data is output as device output C.

(Period T6) Second parity bits Q4, Q5 and Q6 are read out respectively from the third memory 104, first memory 102 and second memory 103, and then stored in the second parity bit queue 110. In parallel with this, the data S3 at the head of the information bit queue 108 is output as device output A. Further, since the 3rd first parity bit has been punctured, dummy data is output as device output B. Further, the data Q2 at the head of the second parity bit queue 110 is output as device output C.

(Period T7) Information bits S7, S8, and S9 are read out respectively from the first memory 102, second memory 103, and third memory 104 and then stored in the information bit queue 108. In parallel with this, the data S4 at the head of the information bit queue 108 is output as device output A. Further, the data P3 at the head of the first parity bit queue 109 and the data Q3 at the head of the second parity bit queue 110 are output respectively as device output B and device output C.

(Period T8) First parity bits P7, P8 and P9 are read out respectively from the second memory 103, third memory 104 and first memory 102, and then stored in the first parity bit queue 109. In parallel with this, the data S5 at the head of the information bit queue 108 is output as device output A. Further, the data P4 at the head of the first parity bit queue 109 is output as device output B. Further, since the 5th second parity bit has been punctured, dummy data is output as device output C.

(Period T9) Second parity bits Q7, Q8 and Q9 are read out respectively from the third memory 104, first memory 102 and second memory 103, and then stored in the second parity bit queue 110. In parallel with this, the data S6 at the head of the information bit queue 108 is output as device output A. Further, since the 6th first parity bit has been punctured, dummy data is output as device output B. Further, the data Q4 at the head of the second parity bit queue 110 is output as device output C.

(Period T10) Information bits S10, S11 and S12 are read out respectively from the first memory 102, second memory 103 and third memory 104 and then stored in the information bit queue 108. In parallel with this, the data S7 at the head of the information bit queue 108 is output as device output A. Further, the data P5 at the head of the first parity bit queue 109 and the data Q5 at the head of the second parity bit queue 110 are output respectively as device output B and device output C.

(Period T11) First parity bits P10, P11 and P12 are read out respectively from the second memory 103, third memory 104 and first memory 102, and then stored in the first parity bit queue 109. In parallel with this, the data S8 at the head of the information bit queue 108 is output as device output A. Further, the data P6 at the head of the first parity bit queue 109 is output as device output B. Further, since the 8th second parity bit has been punctured, dummy data is output as device output C.

(Period T12) Second parity bits Q10, Q11 and Q12 are read out respectively from the third memory 104, first memory 102 and second memory 103, and then stored in the second parity bit queue 110. In parallel with this, the data S9 at the head of the information bit queue 108 is output as device output A. Further, since the 9th first parity bit has been punctured, dummy data is output as device output B. Further, the data Q6 at the head of the second parity bit queue 110 is output as device output C.

(Period T13) Information bits S13, S14 and S15 are read out respectively from the first memory 102, second memory 103 and third memory 104 and then stored in the information bit queue 108. In parallel with this, the data S10 at the head of the information bit queue 108 is output as device output A. Further, the data P7 at the head of the first parity bit queue 109 and the data Q7 at the head of the second parity bit queue 110 are output respectively as device output B and device output C.

(Period T14) At this moment, 5 bits of the first parity bits (P8, P9, P10, P11, P12) are left (remained) in the first parity bit queue 109 that can store up to 6 bits. Thus, there is no space for newly storing 3 bits. Accordingly, nothing is stored at this moment in the first parity bit queue 109. In this case, the data S11 at the head of the information bit queue 108 is output as device output A. Further, the data P8 at the head of the first parity bit queue 109 is output as device output B. Further, since the 11th second parity bit has been punctured, dummy data is output as device output C.

(Period T15) In the second parity bit queue 110 that can store up to 6 bits, 5 bits of the second parity bits (Q8, Q9, Q10, Q11, Q12) are left. Thus, there is no space for newly storing 3 bits. Accordingly, nothing is stored at this moment in the second parity bit queue 110. In this case, the data S12 at the head of the information bit queue 108 is output as device output A. Further, since the 12th first parity bit has been punctured, dummy data is output as device output B. Further, the data Q8 at the head of the second parity bit queue 110 is output as device output C.

(Period T16) Information bits S16, S17 and S18 are read out respectively from the first memory 102, second memory 103 and third memory 104 and then stored in the information bit queue 108. In parallel with this, the data S13 at the head of the information bit queue 108 is output as device output A. Further, the data P9 at the head of the first parity bit queue 109 and the data Q9 at the head of the second parity bit queue 110 are output respectively as device output B and device output C.

(Period T17) First parity bits P13, P14 and P15 are read out respectively from the second memory 103, third memory 104 and first memory 102, and then stored in the first parity bit queue 109. In parallel with this, the data S14 at the head of the information bit queue 108 is output as device output A. Further, the data P10 at the head of the first parity bit queue 109 is output as device output B. Further, since the 14th second parity bit has been punctured, dummy data is output as device output C.

(Period T18) Second parity bits Q13, Q14 and Q15 are read out respectively from the third memory 104, first memory 102 and second memory 103, and then stored in the second parity bit queue 110. In parallel with this, the data S15 at the head of the information bit queue 108 is output as device output A. Further, since the 15th first parity bit has been punctured, dummy data is output as device output B. Further, the data Q10 at the head of the second parity bit queue 110 is output as device output C.

Second Embodiment

When the data to be transmitted is large, the data input to the rate dematching processor may be divided into a plurality of blocks, to each of which first rate dematching process is applied in parallel. This processing is performed to speed up first rate dematching process. Thus, a second embodiment in which first rate dematching process is applied in parallel to the plurality of blocks will be described below. In the present embodiment, first rate dematching process is applied to two blocks. However, even for the case of applying the rate dematching process to larger number of blocks, the present embodiment can be easily expanded.

Figure 5:
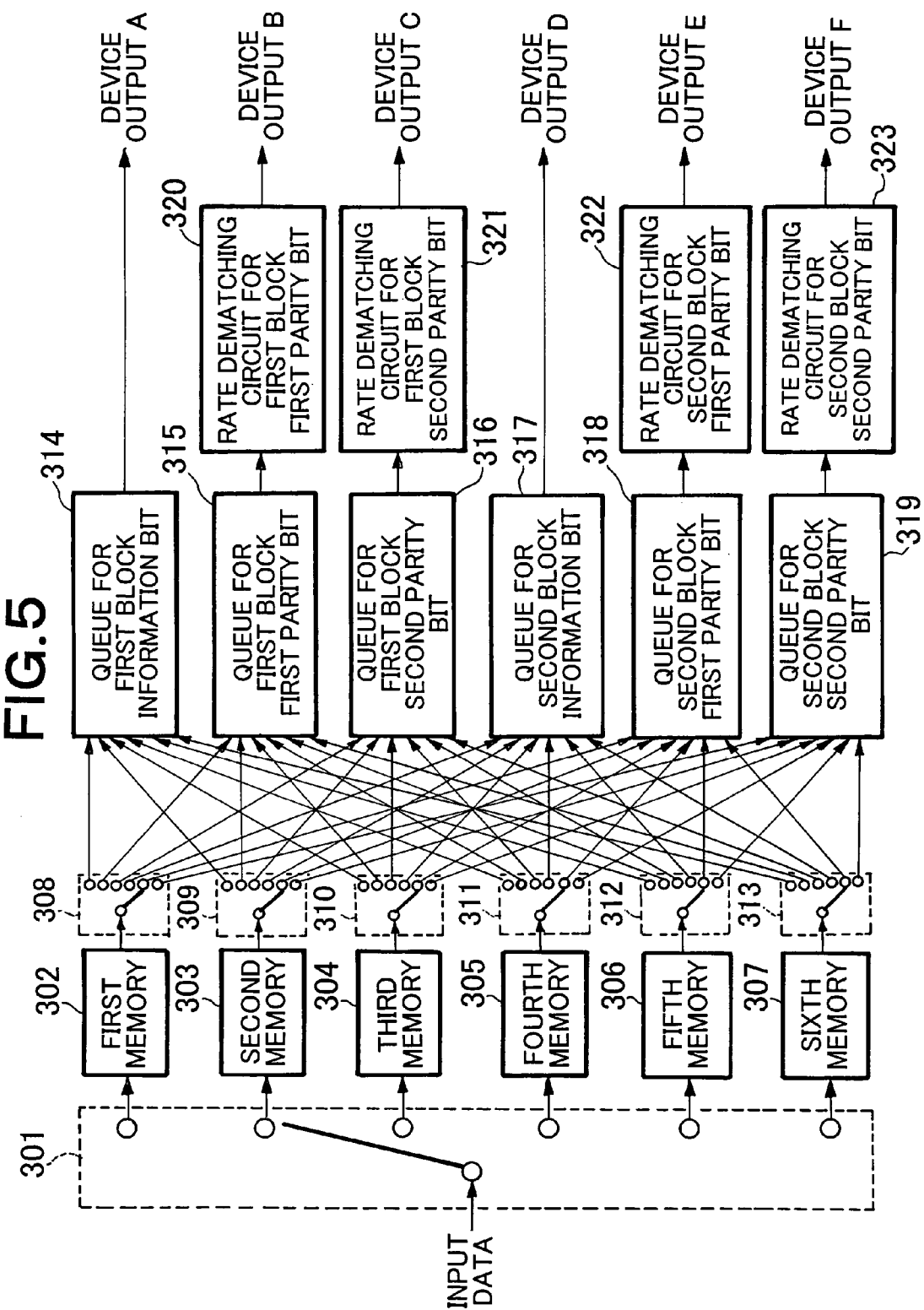
FIG. 5 is a block diagram showing the configuration of a rate dematching processor according to a second embodiment of the present invention.

Referring to FIG. 5, a rate dematching processor according to the second embodiment of the present invention includes switch 301, first memory 302, second memory 303, third memory 304, fourth memory 305, fifth memory 306, sixth memory 307, switches 308, 309, 310, 311, 312, 313, first block information bit queue (queue for first block information bit) 314, first block first parity bit queue (queue for first block first parity bit) 315, first block second parity bit queue (queue for first block second parity bit) 316, second block information bit queue (queue for second block information bit) 317, second block first parity bit queue (queue for second block first parity bit) 318, second block second parity bit queue (queue for second block second parity bit) 319, first block first parity bit rate dematching circuit (rate dematching circuit for first block first parity bit) 320, first block second parity bit rate dematching circuit (rate dematching circuit for first block second parity bit) 321, second block first parity bit rate dematching circuit (rate dematching circuit for second block first parity bit) 322 and second block second parity bit rate dematching circuit (rate dematching circuit for second block second parity bit) 323.

The switch 301 sorts input data into the six memories 302 to 307.

The memories 302 to 307 store the input data sorted by the switch 301.

The switches 308 to 313 sorts the data output from the memories 302 to 307 respectively, into the six queues 314 to 319.

The first block information bit queue 314 holds information bit of the first block sorted by each of the switches 308 to 313. The first block first parity bit queue 315 holds first parity bit of the first block sorted by each of the switches 308 to 313. The first block second parity bit queue 316 holds second parity bit of the first block sorted by each of the switches 308 to 313.

The second block information bit queue 317 holds information bit of the second block sorted by each of the switches 308 to 313. The second block first parity bit queue 318 holds first parity bit of the second block sorted by each of the switches 308 to 313. The second block second parity bit queue 319 holds second parity bit of the second block sorted by each of the switches 308 to 313.

The first block first parity bit rate dematching circuit 320 applies first rate dematching process to the data held by the first block first parity bit queue 315. The first block second parity bit rate dematching circuit 321 applies first rate dematching process to the data held by the first block second parity bit queue 316.

The second block first parity bit rate dematching circuit 322 applies first rate dematching process to the data held by the second block first parity bit queue 318. The second block second parity bit rate dematching circuit 322 applies first rate dematching process to the data held by the second block second parity bit queue 319.

In FIG. 5, device outputs A, B, C, D, E and F correspond to an information bit output of the first block, a first parity bit output of the first block, a second parity bit output of the first block, an information bit output of the second block, a first parity bit output of the second block, and a second parity bit output of the second block, respectively. Note that each of the memories 302 to 306 has a capacity of M/6 bits, and that each of the first block information bit queue 314, first block first parity bit queue 315, first block second parity bit queue 316, second block information bit queue 317, second block first parity bit queue 318, second block second parity bit queue 319 has a capacity of 12 bits.

Next, an operation of the rate dematching processor according to the present embodiment will be described.

(Step 11) First input data is input into the rate dematching processor according to the present embodiment. The switch 301 is then connected to the first memory 302 so as to store the first input data in the first memory 302.

(Step 12) Second input data is input into the rate dematching processor according to the present embodiment. The switch 301 is then connected to the second memory 303 so as to store the second input data in the second memory 303.

(Step 13) Third input data is input into the rate dematching processor according to the present embodiment. The switch 301 is then connected to the third memory 304 so as to store the third input data in the third memory 304.

(Step 14) Fourth input data is input into the rate dematching processor according to the present embodiment. The switch 301 is then connected to the fourth memory 305 so as to store the fourth input data in the fourth memory 305.

(Step 15) Fifth input data is input into the rate dematching processor according to the present embodiment. The switch 301 is then connected to the fifth memory 306 so as to store the fifth input data in the fifth memory 306.

(Step 16) Sixth input data is input into the rate dematching processor according to the present embodiment. The switch 301 is then connected to the sixth memory 307 so as to store the sixth input data in the sixth memory 307.

(Step 17) Subsequently, the same process as step 11 is performed to (6n+1)th (n=1, 2, . . . , M/6−1; 6n indicates n times 6) input data, the same process as step 12 is performed to (6n+2)th (n=1, 2, . . . , M/6−1; 6n indicates n times 6) input data, the same process as step 13 is performed to (6n+3)th (n=1, 2, . . . , M/6−1; 6n indicates n times 6) input data, the same process as step 14 is performed to (6n+4)th (n=1, 2, . . . , M/6−1; 6n indicates n times 6) input data, the same process as step 15 is performed to (6n+5)th (n=1, 2, . . . , M/6−1; 6n indicates n times 6) input data, and the same process as step 16 is performed to (6n+6)th (n=1, 2, . . . , M/6−1; 6n indicates n times 6) input data (M/6−1 indicates M/6 minus 1). In this manner, M pieces of input data are stored in the memories 302 to 307.

(Step 18) The following steps 18-1 to 18-7 are performed in parallel.

(Step 18-1) The switches 308 to 313 are connected to the first block information bit queue 314. Information bit of the first block is then read out, by 1 bit, from each of the memories 302 to 307 to store 6 bits of information bits in the first block information bit queue 314 in total.

(Step 18-2) Information bit stored at the head of the first block information bit queue 314 is read out and output as device output A.

(Step 18-3) When an insertion of dummy data is performed in the first block first parity bit rate dematching circuit 320 (in this case, the data has been punctured in first rate matching process at sending end), the dummy data is output as device output B. Alternatively, first parity bit stored at the head of the first block first parity bit queue 315 is read out and output as device output B.

(Step 18-4) When an insertion of dummy data is performed in the first block second parity bit rate dematching circuit 321, the dummy data is output as device output C. Alternatively, second parity bit stored at the head of the first block second parity bit queue 316 is read out and output as device output C.

(Step 18-5) Information bit stored at the head of the second block information bit queue 317 is read out and output as device output D.

(Step 18-6) When an insertion of dummy data is performed in the second block first parity bit rate dematching circuit 322, the dummy data is output as device output E. Alternatively, first parity bit stored at the head of the second block first parity bit queue 318 is read out and output as device output E.

(Step 18-7) When an insertion of dummy data is performed in the second block second parity bit rate dematching circuit 323, the dummy data is output as device output F. Alternatively, second parity bit stored at the head of the second block second parity bit queue 319 is read out and output as device output F.

(Step 19) The following steps 19-1 to 19-7 are performed in parallel.

(Step 19-1) The switches 308 to 313 are connected to the first block first parity bit queue 315. When the data having a data amount equal to or less than 6 bits is left in the queue 315, first parity bit of the first block is read out, by 1 bit, from each of the memories 302 to 307 to store 6 bits of first parity bits in the first block first parity bit queue 315 in total. When the data having a data amount equal to or more than 7 bits is left in the first block first parity bit queue 315, since there is no space for newly storing 6 bits of the first parity bit, nothing is performed.

(Step 19-2) Information bit stored at the head of the first block information bit queue 314 is read out and output as device output A.

(Step 19-3) When an insertion of dummy data is performed in the first block first parity bit rate dematching circuit 320, the dummy data is output as device output B. Alternatively, first parity bit stored at the head of the first block first parity bit queue 315 is read out and output as device output B.

(Step 19-4) When an insertion of dummy data is performed in the first block second parity bit rate dematching circuit 321, the dummy data is output as device output C. Alternatively, second parity bit stored at the head of the first block second parity bit queue 316 is read out and output as device output C.

(Step 19-5) Information bit stored at the head of the second block information bit queue 317 is read out and output as device output D.

(Step 19-6) When an insertion of dummy data is performed in the second block first parity bit rate dematching circuit 322, the dummy data is output as device output E. Alternatively, first parity bit stored at the head of the second block first parity bit queue 318 is read out and output as device output E.

(Step 19-7) When an insertion of dummy data is performed in the second block second parity bit rate dematching circuit 323, the dummy data is output as device output F. Alternatively, second parity bit stored at the head of the second block second parity bit queue 319 is read out and output as device output F.

(Step 20) The following steps 20-1 to 20-7 are performed in parallel.

(Step 20-1) The switches 308 to 313 are connected to the first block second parity bit queue 316. When the data having a data amount equal to or less than 6 bits is left in the first block second parity bit queue 316, second parity bit of the first block is read out, by 1 bit, from each of the memories 302 to 307 to store 6 bits of second parity bits in the first block second parity bit queue 316 in total. When the data having a data amount equal to or more than 7 bits is left in the first block second parity bit queue 316, since there is no space for newly storing 6 bits of the second parity bit, nothing is performed.

(Step 20-2) Information bit stored at the head of the first block information bit queue 314 is read out and output as device output A.

(Step 20-3) When an insertion of dummy data is performed in the first block first parity bit rate dematching circuit 320, the dummy data is output as device output B. Alternatively, first parity bit stored at the head of the first block first parity bit queue 315 is read out and output as device output B.

(Step 20-4) When an insertion of dummy data is performed in the first block second parity bit rate dematching circuit 321, the dummy data is output as device output C. Alternatively, second parity bit stored at the head of the first block second parity bit queue 316 is read out and output as device output C.

(Step 20-5) Information bit stored at the head of the second block information bit queue 317 is read out and output as device output D.

(Step 20-6) When an insertion of dummy data is performed in the second block first parity bit rate dematching circuit 322, the dummy data is output as device output E. Alternatively, first parity bit stored at the head of the second block first parity bit queue 318 is read out and output as device output E.

(Step 20-7) When an insertion of dummy data is performed in the second block second parity bit rate dematching circuit 323, the dummy data is output as device output F. Alternatively, second parity bit stored at the head of the second block second parity bit queue 319 is read out and output as device output F.

(Step 21) The following steps 21-1 to 21-7 are performed in parallel.

(Step 21-1) The switches 308 to 313 are connected to the second block information bit queue 317. Information bit of the second block is then read out, by 1 bit, from each of the memories 302 to 307 to store 6 bits of information bits in the second block information bit queue 317 in total.

(Step 21-2) Information bit stored at the head of the first block information bit queue 314 is read out and output as device output A.

(Step 21-3) When an insertion of dummy data is performed in the first block first parity bit rate dematching circuit 320 (in this case, the data has been punctured in first rate matching process at sending end), the dummy data is output as device output B. Alternatively, first parity bit stored at the head of the first block first parity bit queue 315 is read out and output as device output B.

(Step 21-4) When an insertion of dummy data is performed in the first block second parity bit rate dematching circuit 321, the dummy data is output as device output C.

Alternatively, second parity bit stored at the head of the first block second parity bit queue 316 is read out and output as device output C.

(Step 21-5) Information bit stored at the head of the second block information bit queue 317 is read out and output as device output D.

(Step 21-6) When an insertion of dummy data is performed in the second block first parity bit rate dematching circuit 322, the dummy data is output as device output E. Alternatively, first parity bit stored at the head of the second block first parity bit queue 318 is read out and output as device output E.

(Step 21-7) When an insertion of dummy data is performed in the second block second parity bit rate dematching circuit 323, the dummy data is output as device output F. Alternatively, second parity bit stored at the head of the second block second parity bit queue 319 is read out and output as device output F.

(Step 22) The following steps 22-1 to 22-7 are performed in parallel.

(Step 22-1) The switches 308 to 313 are connected to the second block first parity bit queue 318. When the data having a data amount equal to or less than 6 bits is left in the second block first parity bit queue 318, first parity bit of the second block is read out, by 1 bit, from each of the memories 302 to 307 to store 6 bits of first parity bits in the second block first parity bit queue 318 in total. When the data having a data amount equal to or more than 7 bits is left in the second block first parity bit queue 318, since there is no space for newly storing 6 bits of the first parity bit, nothing is performed.

(Step 22-2) Information bit stored at the head of the first block information bit queue 314 is read out and output as device output A.

(Step 22-3) When an insertion of dummy data is performed in the first block first parity bit rate dematching circuit 320, the dummy data is output as device output B. Alternatively, first parity bit stored at the head of the first block first parity bit queue 315 is read out and output as device output B.

(Step 22-4) When an insertion of dummy data is performed in the first block second parity bit rate dematching circuit 321, the dummy data is output as device output C. Alternatively, second parity bit stored at the head of the first block second parity bit queue 316 is read out and output as device output C.

(Step 22-5) Information bit stored at the head of the second block information bit queue 317 is read out and output as device output D.

(Step 22-6) When an insertion of dummy data is performed in the second block first parity bit rate dematching circuit 322, the dummy data is output as device output E. Alternatively, first parity bit stored at the head of the second block first parity bit queue 318 is read out and output as device output E.

(Step 22-7) When an insertion of dummy data is performed in the second block second parity bit rate dematching circuit 323, the dummy data is output as device output F. Alternatively, second parity bit stored at the head of the second block second parity bit queue 319 is read out and output as device output F.

(Step 23) The following steps 23-1 to 23-7 are performed in parallel.

(Step 23-1) The switches 308 to 313 are connected to the second block second parity bit queue 319. When the data having a data amount equal to or less than 6 bits is left in the second block second parity bit queue 319, second parity bit of the second block is read out, by 1 bit, from each of the memories 302 to 307 to store 6 bits of second parity bits in the second block second parity bit queue 319 in total. When the data having a data amount equal to or more than 7 bits is left in the second block second parity bit queue 319, since there is no space for newly storing 6 bits of the second parity bits, nothing is performed.

(Step 23-2) Information bit stored at the head of the first block information bit queue 314 is read out and output as device output A.

(Step 23-3) When an insertion of dummy data is performed in the first block first parity bit rate dematching circuit 320, the dummy data is output as device output B. Alternatively, first parity bit stored at the head of the first block first parity bit queue 315 is read out and output as device output B.

(Step 23-4) When an insertion of dummy data is performed in the first block second parity bit rate dematching circuit 321, the dummy data is output as device output C. Alternatively, second parity bit stored at the head of the first block second parity bit queue 316 is read out and output as device output C.

(Step 23-5) Information bit stored at the head of the second block information bit queue 317 is read out and output as device output D.

(Step 23-6) When an insertion of dummy data is performed in the second block first parity bit rate dematching circuit 322, the dummy data is output as device output E. Alternatively, first parity bit stored at the head of the second block first parity bit queue 318 is read out and output as device output E.

(Step 23-7) When an insertion of dummy data is performed in the second block second parity bit rate dematching circuit 323, the dummy data is output as device output F. Alternatively, second parity bit stored at the head of the second block second parity bit queue 319 is read out and output as device output F.

(Step 24) First rate dematching process can be performed to all data in the first and second blocks by repeating the above steps 18 to 23.

Third Embodiment

In the first embodiment, three memories 102, 103, and 104 are used in the rate matching processor. The rate dematching processor according to the present embodiment includes one memory.

Figure 6:
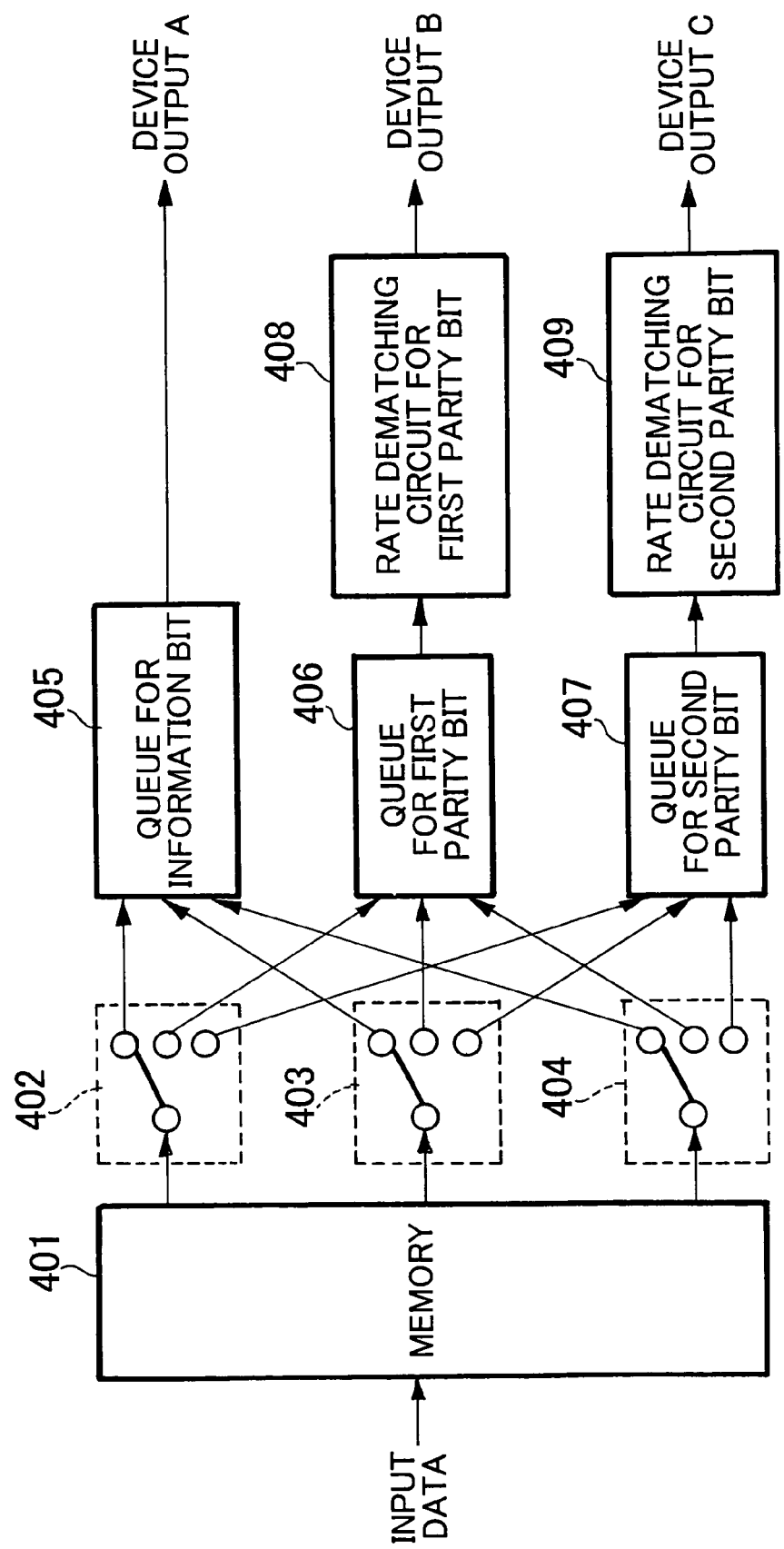
FIG. 6 is a block diagram showing the configuration of a rate dematching processor according to a third embodiment of the present invention.

Referring to FIG. 6, the rate dematching processor according to the third embodiment of the present invention includes a memory 401, switches 402, 403, and 404, an information bit queue (queue for information bit) 405, a first parity bit queue (queue for first parity bit) 406, a second parity bit queue (queue for second parity bit) 407, a first parity bit rate dematching circuit (rate dematching circuit for first parity bit) 408, and a second parity bit rate dematching circuit (rate dematching circuit for second parity bit) 409.

The memory 401 stores input data.

Each of the switches 402 to 404 sorts the data output from the memory 401 to any of the information bit queue 405, first parity bit queue 406 and second parity bit queue 407.

The information bit queue 405 holds information bit sorted by the switches 402 to 404. The first parity bit queue 406 holds first parity bit sorted by the switches 402 to 404. The second parity bit queue 407 holds second parity bit sorted by the switches 402 to 404.

The first parity bit rate dematching circuit 408 applies first rate dematching process to the data held by the first parity bit queue 406. The second parity bit rate dematching circuit 409 applies first rate dematching process to the data held by the second parity bit queue 407.

Each of the switch 402, switch 403, switch 404, information bit queue 405, first parity bit queue 406, second parity bit queue 407, first parity bit rate dematching circuit 408, and second parity bit rate dematching circuit 409 has the same configuration as that of each of the switch 105, switch 106, switch 107, information bit queue 108, first parity bit queue 109, second parity bit queue 110, first parity bit rate dematching circuit 111 and second parity bit rate dematching circuit 112 of the first embodiment. Note that the memory 401 of the third embodiment has a capacity of M bits.

An operation of the rate dematching processor according to the present embodiment will be described.

It is assumed that M pieces of input data in total are input to the rate dematching processor according to the present embodiment in the order of an information bit string, a first parity bit string and a second parity bit string. Note that the information bit, first parity bit and second parity bit are included in M pieces of input data at an arbitrary ratio.

(Step 31) First input data is input into the rate dematching processor according to the present embodiment, and then stored in the memory 401.

(Step 32) Subsequently, the same process as step 31 is performed to n-th (n=2, . . . , M) input data. In this manner, M pieces of input data are stored in the memory 401.

Subsequently, the same operation (Steps 5 to 8) as that in the first embodiment is performed except for data readout from the memory, that is, 3 bits of data is read out from the single memory 401 in the present embodiment, whereas 3 bits of data is read out from the three memories 102 to 104 in the first embodiment.

What is claimed is:

1. A processor which performs a rate dematching process with respect to rate matched data including information bit, first parity bit and second parity bit, comprising:
   one or a plurality of memories which store the data input;
   data reading out means for reading out the information bit, first parity bit and second parity bit from said one or a plurality of memories every 3n bits, said n being a natural number; and
   data holding means provided at least for each of the information bit, first parity bit and second parity bit, for holding the data read out by said data reading out means in order to control data supply to a rate dematching circuit.

2. A processor which performs a rate dematching process with respect to rate matched data including information bit, first parity bit and second parity bit, comprising:
   a first memory which stores (3n+1)th input data, a second memory which stores (3n+2)th input data and a third memory which stores (3n+3)th input data, wherein n is an integer not more than M/3−1 and M is multiples of 3;
   data reading out means for reading out the information bit, first parity bit and second parity bit from each of said first to third memories every 3 bits; and
   an information bit queue, a first parity bit queue and second parity bit queue which hold information bit, first parity bit and second parity bit read out every 3 bits by said data reading out means, respectively to control data supply to a rate dematching circuit.

3. A processor which performs a rate dematching process with respect to rate matched data including information bit, first parity bit and second parity bit, comprising:
   a memory which stores input data in the order of inputting;
   data reading out means for reading out the information bit, first parity bit and second parity bit from said memory every 3 bits; and
   an information bit queue, a first parity bit queue and second parity bit queue which hold information bit, first parity bit and second parity bit read out every 3 bits, respectively to control data supply to a rate dematching circuit.

4. A processor which performs rate dematching with respect to rate matched data including information bit, first parity bit and second parity bit, comprising:
   a first memory which stores (6n+1)th input data, a second memory which stores (6n+2)th input data, a third memory which stores (6n+3)th input data, a fourth memory which stores (6n+4)th input data, a fifth memory which stores (6n+5)th input data, and sixth memory which stores (6n+6)th input data, wherein n is an integer not more than M/6−1 and M is multiples of 6;
   data reading out means for reading out the information bits, first parity bits, and second parity bits from each of said first to sixth memories every 6 bits, the information bits, first parity bits and second parity bits read out every 6 bits being divided into a first block and a second block;
   a first block information bit queue, a first block first parity bit queue, and a first block second parity bit queue which hold first block information bit, first block first parity bit and first block second parity bit, respectively, to control data supply to a rate dematching circuit; and
   a second block information bit queue, a second block first parity bit queue and a second block second parity bit queue which hold second block information bit, second block first parity bit and second block second parity bit, respectively, to control data supply to said rate dematching circuit.

* * * * *